US011262332B2

(12) United States Patent
Benkert et al.

(10) Patent No.: US 11,262,332 B2
(45) Date of Patent: Mar. 1, 2022

(54) METHOD FOR OPERATING A MEASURING DEVICE AND MEASURING DEVICE

(71) Applicant: DIEHL METERING GMBH, Ansbach (DE)

(72) Inventors: Andreas Benkert, Ansbach (DE); Michael Mayle, Ansbach (DE); Peter Ploss, Bayreuth (DE)

(73) Assignee: Diehl Metering GmbH, Ansbach (DE)

( * ) Notice: Subject to any disclaimer, the term of this patent is extended or adjusted under 35 U.S.C. 154(b) by 196 days.

(21) Appl. No.: 16/689,217

(22) Filed: Nov. 20, 2019

(65) Prior Publication Data

US 2020/0166393 A1 May 28, 2020

(30) Foreign Application Priority Data

Nov. 22, 2018 (DE) .................... 10 2018 009 199

(51) Int. Cl.
*G01N 29/024* (2006.01)
*G01F 1/667* (2022.01)
*G01N 29/22* (2006.01)
*G01F 1/66* (2022.01)
*G01P 5/24* (2006.01)

(52) U.S. Cl.
CPC ............. *G01N 29/024* (2013.01); *G01F 1/66* (2013.01); *G01F 1/662* (2013.01); *G01F 1/667* (2013.01); *G01N 29/222* (2013.01); *G01P 5/245* (2013.01); *G01N 2291/02836* (2013.01)

(58) Field of Classification Search
CPC .. G01N 29/024; G01N 29/041; G01N 29/222; G01N 2291/02836; G01F 1/667; G01F 1/66; G01F 1/662; G01P 5/245
See application file for complete search history.

(56) References Cited

U.S. PATENT DOCUMENTS

| 2008/0163700 A1* | 7/2008 | Huang | G01F 1/663 |
| | | | 73/861.25 |
| 2016/0025537 A1* | 1/2016 | Barkin | G01F 25/0007 |
| | | | 73/861.27 |

FOREIGN PATENT DOCUMENTS

| WO | 2010034713 A2 | 4/2010 |
| WO | 2018204723 A1 | 11/2018 |

* cited by examiner

*Primary Examiner* — Benjamin R Schmitt

(74) *Attorney, Agent, or Firm* — Laurence A. Greenberg; Werner H. Stemer; Ralph E. Locher

(57) ABSTRACT

A measuring device, in particular a flow meter, has a measurement tube for receiving or conveying a fluid, first and second oscillation transducers on a side wall of the measurement tube, and a control device. An operating method has the control device drive the first oscillation transducer chronologically in succession for respective mode-selective excitation of a first and a second oscillation mode of a wave conducted in the side wall of the measurement tube. The second oscillation transducer is driven similarly for a second measurement direction. The excited waves are conducted directly in the side wall or indirectly through the fluid and recorded in the other oscillation transducer, resulting in measurement data for each measurement direction and oscillation mode. Result information relates to a property of the fluid or a state of the measuring device determined from the measurement data for both measurement directions and both respective oscillation modes.

13 Claims, 2 Drawing Sheets

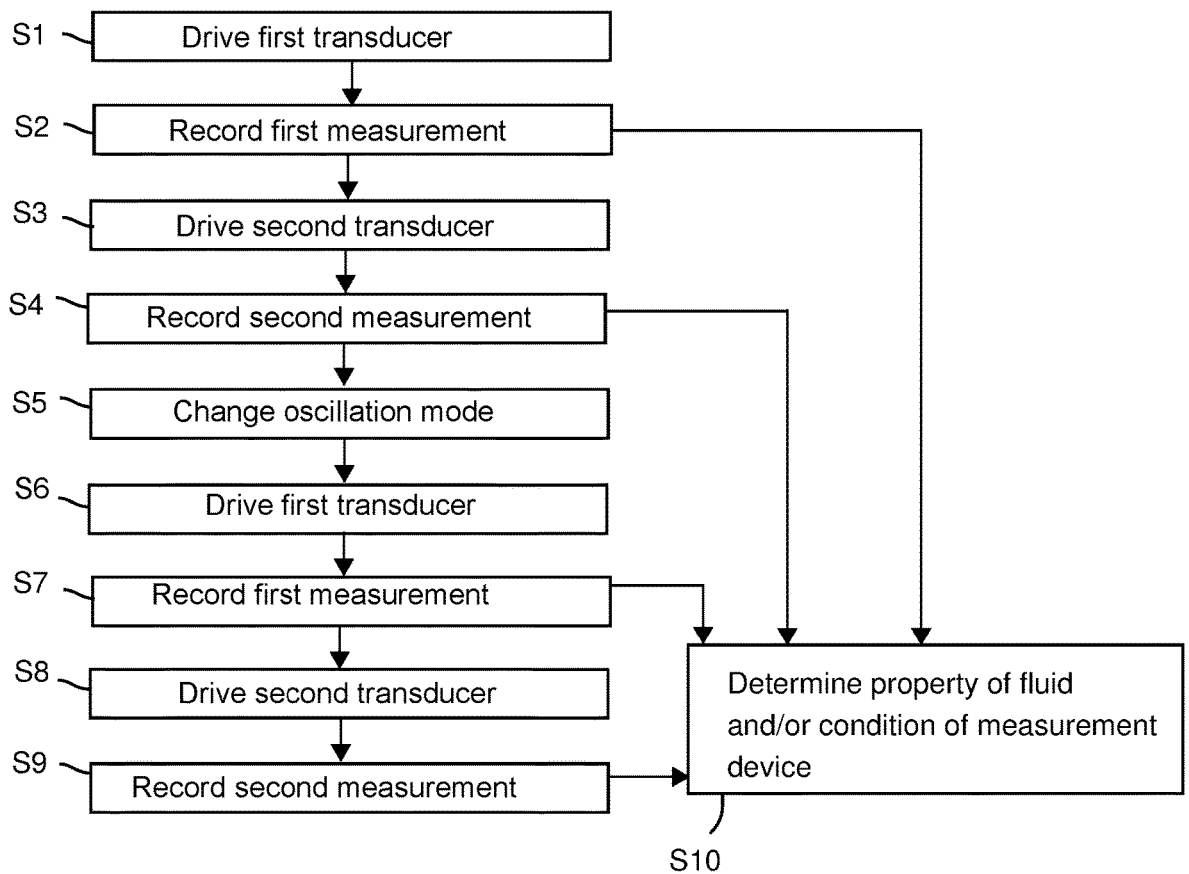
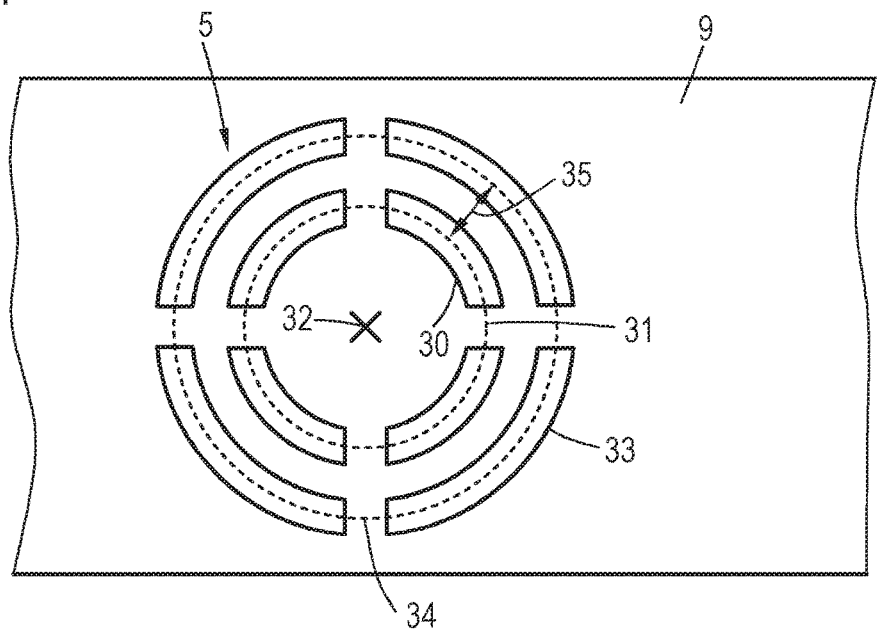

METHOD FOR OPERATING A MEASURING DEVICE AND MEASURING DEVICE

CROSS-REFERENCE TO RELATED APPLICATION

This application claims the priority, under 35 U.S.C. § 119, of German patent application DE 10 2018 009 199, filed Nov. 22, 2018; the prior application is herewith incorporated by reference in its entirety.

BACKGROUND OF THE INVENTION

Field of the Invention

The invention relates to a method for operating a measuring device, in particular a flow meter. The flow meter has a measurement tube that is used to receive or convey a fluid, a first and a second oscillation transducer arranged on a or a respective side wall of the measurement tube, and a control device. The invention furthermore relates to a measuring device, in particular a flow meter.

One possibility for measuring a flow or through a measurement tube involves ultrasonic meters. In these, at least one ultrasound transducer is used in order to introduce an ultrasound wave into the fluid flowing through the measurement tube, this wave being conducted on a straight path or after multiple reflections at walls or special reflection elements to a second ultrasound transducer. A flow speed through the measurement tube can be determined from the time of flight of the ultrasound wave between the ultrasound transducers, or from a time-of-flight difference when interchanging the transmitter and the receiver.

International patent application WO 2010/034713 A2 discloses introducing Lamb waves into a side wall of a measurement tube, which are emitted from there into the fluid and are used to measure fluid properties. In this case, it is known that a plurality of oscillation modes may be excited when exciting Lamb waves with a particular frequency. In the aforementioned document, the fact is used that the different excited wave modes have different times of flight from one another, so that with a corresponding configuration of the measurement setup measurement signals which result from the reception of the different modes may be processed separately in order to determine physical or chemical properties of the medium conveyed in the measurement tube.

A problem in this case is that, in particular when the conducted wave is conducted over relatively short distances in the tube wall, robust separation of the measurement signals of the different modes is often not possible, or is possible only using complex algorithms, which on the one hand increases the required computing power for measurement data evaluation and, on the other hand, may potentially generate additional artifacts or other errors in the measurement data.

SUMMARY OF THE INVENTION

It is accordingly an object of the invention to provide a measuring device and a method for operating a measuring device which overcome the above-mentioned and other disadvantages of the heretofore-known devices and methods of this general type and to provide for a possibility which is more robust or less computation-intensive, in order to obtain additional information about properties of the fluid or a state of the measuring device in flow meters or similar measuring devices.

With the foregoing and other objects in view there is provided, in accordance with the invention, a method of operating a measuring device, the measuring device including a measurement tube for receiving or conveying a fluid, a first oscillation transducer and a second oscillation transducer arranged on a side wall of the measurement tube, and a control device. The method comprises the following steps:

for a first measurement direction, driving the first oscillation transducer with the control device chronologically in succession for a respective mode-selective excitation of a first and a second oscillation mode of a first wave conducted in the side wall of the measurement tube;

for a second measurement direction, driving the second oscillation transducer with the control device chronologically in succession for a respective mode-selective excitation of a first and a second oscillation mode of a second wave conducted in the side wall of the measurement tube;

wherein the first wave thus excited is conducted directly in the side wall or indirectly through the fluid to the second oscillation transducer and recorded there, and the second wave thus excited is conducted directly in the side wall or indirectly through the fluid to the first oscillation transducer and recorded there, for determining respective measurement data for the respective measurement direction and oscillation mode; and determining with the control device result information that relates to a property of the fluid or a state of the measuring device from the measurement data for both measurement directions and both oscillation modes.

In other words, the above and other objects are achieved according to the invention by a method of the type mentioned in the introduction, wherein the control device, for a first measurement direction, drives the first oscillation transducer chronologically in succession for respective mode-selective excitation of a first and a second oscillation mode of a wave conducted in the side wall of the measurement tube, and for a second measurement direction drives the second oscillation transducer chronologically in succession for respective mode-selective excitation of a first and a second oscillation mode of a wave conducted in the side wall of the measurement tube, the excited waves respectively being conducted directly in the side wall or indirectly through the fluid to the respective other oscillation transducer and recorded there in order to determine respective measurement data for the respective measurement direction and oscillation mode, result information that relates to a property of the fluid or a state of the measuring device being determined by the control device from the measurement data for both measurement directions and both respective oscillation modes.

According to the invention, instead of common excitation of a plurality of modes, it is therefore proposed to mode-selectively excite the different modes sequentially after one another. Mode-selective excitation is in this case, in particular, to mean pure-mode or substantially pure-mode excitation. In particular, in the case of mode-selective excitation of the first mode, the amplitude of this mode may be greater by at least a factor of 3 or 10 or 100, or preferably by a much greater factor, than the amplitude of the second mode, or all other excited oscillation modes, and vice versa. In other words, the mode-selective excitation for this first oscillation mode is carried out in a first time interval and the mode-selective excitation of the second oscillation mode is carried out in a second time interval, which does not overlap with the first time interval. In particular, the two time intervals may be separated from one another, and excitation for the measurement in the other measurement direction may for example take place between them, as will be explained in more detail below.

Because the oscillation modes are mode-selectively excited at different times, it is possible to ensure that reception of the respective emitted wave of the different oscillation modes takes place at a sufficient time spacing, so that unproblematic separation of the measurement signals is possible. Possibilities for mode-selective or high-grade pure-mode excitation will be explained in more detail below. In addition to the mode-selective excitation, it is also possible to configure the respectively receiving oscillation transducer in such a way that it carries out mode-selective reception, i.e. signals which result from an undesired mode are substantially suppressed. Since, by the mode-selective excitation used according to the invention, the reception of the different modes can be carried out at a significant time spacing, such mode-selective reception is also readily possible, as will be explained in more detail below.

Because at least four sets of separate measurement data are recorded in the scope of the method according to the invention, namely in each case one set of measurement data for the first measurement direction and the first oscillation mode, for the first measurement direction and the second oscillation mode, for the second measurement direction and the first oscillation mode, and for the second measurement direction of the second oscillation mode, there is substantially more data available than in the case of conventional flow measurements, so that in particular information for diagnostic purposes, or information which may potentially improve a measurement accuracy, may be determined as result information. The result information is therefore intended in particular not to relate to a property of the fluid flow, i.e. for example a flow quantity, a flow speed or a flow profile, but rather a property of the fluid itself, i.e. in particular a chemical or physical property. For example, the result information may relate to a temperature, an in particular static pressure or a composition of the fluid. In this case absolute quantities may be determined, i.e. for example directly the temperature or the pressure of the fluid, or for example deviations from a given reference value may be determined, or whether or not the corresponding property lies within a predetermined setpoint range may be determined.

The result information may also relate to the state of the measuring device itself, i.e. for example the extent to which deposits are present in the measurement tube. The result information may in this case specify qualitatively the extent to which the operating state is normal. For example, the fact that the measuring device is ready for operation, that maintenance should be carried out within a particular interval, or that the state of the measuring device may lead to large measurement errors so that further operation should be suspended, may be determined as result information. As an alternative or in addition, however, specific properties, for example a degree to which the measurement to is obstructed by deposits or the like, may tube also be determined.

Oscillation modes with equal frequency may be excited as the first and second oscillation modes. The first and second oscillation modes may, in particular, be oscillation modes of a Lamb wave. The excitation frequency may preferably be selected in such a way that precisely two oscillation modes, in particular precisely two oscillation modes of a Lamb wave, can be excited at this excitation frequency. A corresponding frequency may be determined from the dispersion relation of the side wall which may for example be theoretically calculated or measured. In the case of excitation of Lamb waves, the excitation frequency may be selected in such a way that precisely one asymmetrical or precisely one symmetrical oscillation mode can be excited. As will be explained in more detail below, by corresponding selection of the excitation geometry, one of the modes that can be excited at a particular frequency may in particular be deliberately suppressed so that the remaining mode can be excited substantially as a pure mode with a very high signal-to-noise ratio.

In the method according to the invention, preferably, initially mode-selective excitation of the first oscillation mode by the first and second oscillation transducers and recording of measurement values for the first oscillation mode for both measurement directions, and then mode-selective excitation of the second oscillation mode by the first and second oscillation transducers and recording of measurement values for the second oscillation mode for both measurement directions, may be carried out. In this way, the time spacing between measurements with the same oscillation mode and a different measurement direction may be minimized, and in this way the influence of changes of a fluid flow in the measurement region may be minimized. It has been found that, with such a procedure of the measurement, properties of the fluid itself or information about the state of the measuring device may be determined with particularly high accuracy and particularly low susceptibility to error. The measurements for the different measurement directions may be carried out at a short time spacing from one another. Typically, however, there should be a sufficiently long wait so that the conduction of the excited wave and possibly further waves reflected or scattered on different paths to the respectively receiving oscillation transducer is completed. This is typically the case after about 100 µs, so that for example a time spacing of between 100 µs and 10 ms between the two measurements for different measurement directions with the same oscillation mode may be used.

As already mentioned in the introduction, the result information may relate to a temperature and/or an in particular static pressure of the fluid and/or to a type and/or composition of the fluid and/or the presence of deposits in the measurement tube. For the aforementioned quantities, it has been found that they may significantly influence the times of flight of different oscillation modes, or the reception amplitudes for different oscillation modes, so that they can be recorded well by the method according to the invention.

The respective measurement data may relate to a respective signal time of flight of the respective oscillation mode for the respective measurement direction between the oscillation transducers and/or to a reception amplitude for the respective oscillation mode and measurement direction. A difference of the signal times of flight between the first and second measurement direction may respectively be determined for the first and second oscillation modes, the result information being determined as a function of the difference or of the ratio of these differences of the signal time of flight. As an alternative or in addition, the result information may be determined as a function of a difference or of a ratio of the signal times of flight or reception amplitudes between the first and second oscillation modes for the same measurement direction. The result information may be determined as a function of the aforementioned information, or measurement data, for example with the aid of a lookup table or a functional relationship, which has for example been empirically determined beforehand or trained in the scope of machine learning. By calculating the aforementioned intermediate results, influences of other quantities, for example of a flow speed or a flow profile, may be reduced or eliminated according to requirements, in order to obtain result information substantially independent of properties of the fluid flow.

The signal time of flight depends, in particular, on the propagation speed of the corresponding mode in the side wall of the measurement tube, or in the fluid, and furthermore on the propagation path, and therefore in particular the Rayleigh angle at which the conducted wave is introduced into the fluid. The Rayleigh angle in turn depends on the speeds of sound in the fluid and in the side wall. With the aid of the signal amplitude at the receiving oscillation transducer, for example, an attenuation of the oscillation during the transport through the fluid may be recorded. In addition or as an alternative, it is also possible to obtain information about the dispersion behavior of the measurement trajectory, for example by evaluating distortions in an envelope of the excitation pulse, or the like.

In the method according to the invention, mode-selective excitation, or in particular substantially pure-mode excitation, of individual oscillation modes is intended to be carried out, the intention being to switch between the excitation of different oscillation modes. Mode selectivity may for example be achieved by use of interdigital transducers, or by coupling an oscillation transducer to the side wall via a wedge-shaped coupling element. With such oscillation transducers, however, it is relatively difficult to change between the excitation of different modes. Although it would in principle be possible to adapt a coupling angle between the oscillation transducer and the side wall, for example by corresponding actuators, or to use different interdigital transducers for excitation of the different oscillation modes. This however results in a more elaborate construction of the measuring device, and such a change of an excited mode may furthermore lead to influencing of the measurement geometry, which would have to be taken into account in the further processing of the measurement data.

It is therefore advantageous for the first and/or second oscillation transducer to respectively comprise a plurality of oscillation elements, the mode-selective excitation of the first and/or second oscillation mode being carried out by partial waves conducted in the side wall, which are superimposed to form the respective conducted wave, being excited in a plurality of mutually separated excitation regions of the side wall by at least one of the oscillation elements, which is oscillation-coupled to the respective excitation region, the oscillation elements being driven in such a way that the respective other oscillation mode is at least partially suppressed by destructive interference of the partial waves.

It is therefore proposed to excite the side wall of the measurement tube in a plurality of mutually separated excitation regions, independent excitation in the excitation regions in principle being possible by the use of separate oscillation elements for the individual excitation regions. By superposition of the partial waves excited in this way, the overall wave is generated, which is subsequently conducted in the side wall and used for excitation of the compression oscillations in the fluid. In this case, the geometrical arrangement of the excitation regions and the respective excitation profiles are adapted to one another in such a way that an oscillation mode to be attenuated is attenuated by destructive interference. In this case, for example, excitation with the same frequency may preferably be carried out for both oscillation transducers, in which case mode-selective excitation may be carried out in a controlled way by corresponding selection of the phase angle of the excitation or of the polarities of the excitation, and sometimes by adapting the amplitude profiles to one another, as will be explained in more detail below.

The oscillation elements may in particular be piezoelectric elements, which are preferably excited in oscillations perpendicularly to the side wall. The oscillation elements may in particular be plate-shaped or bar-shaped, and arranged parallel to the surface of the side wall.

The first or respectively the second oscillation transducer may be used in order to excite a substantially plane wavefront of the side wall. This may for example be achieved in that the individual oscillation elements extend substantially over the entire width of the side wall, or in that a plurality of oscillation elements driven together excite together an excitation region which extends substantially over the entire width of the side wall. The different excitation regions may in this case be spaced apart from one another in the longitudinal direction of the measurement tube. The spacing of the middles of the excitation regions and the phase angle, or the polarity, of the excitation may then be adjusted in order to achieve the intended destructive interference of the undesired oscillation mode.

The oscillation transducers may be constructed particularly simply if, with the aid of the known dispersion relation of the side wall, the excitation frequency for excitation of the conducted waves is selected in such a way that precisely two oscillation modes can be excited, a longwave one of these two oscillation modes having precisely double the wavelength of the shortwave other one of these oscillation modes. If the spacing of the middles of the excitation regions is then selected in such a way that it corresponds to the wavelength of the shortwave oscillation mode, then excitation with the same polarity and phase in the two excitation regions leads to constructive interference resulting for the shortwave oscillation mode and destructive interference resulting for the longwave oscillation mode. Substantially pure-mode excitation of the shortwave oscillation mode therefore takes place. If however excitation is carried out with a phase shift of 180°, or with reversed polarity, this results in destructive interference for the shortwave oscillation mode and constructive interference for the longwave oscillation mode, so that substantially pure-mode excitation of the longwave oscillation mode takes place. In the case described, optimal constructive interference can therefore be achieved for the oscillation mode to be excited mode-selectively and optimal destructive interference for the undesired oscillation mode. The described optimal destructive interference may, however, also be achieved when the wavelengths of the two oscillation modes have a different ratio to one another, in particular when the phase angle between the excitations in the excitation regions is freely selectable, for example with the aid of a retardation element for the control signals. The excitations in the excitation regions may thus constantly be adapted to one another in such a way that fully destructive interference always substantially results for an undesired mode.

The described procedure is, however, possible only for plane wavefronts. In principle, arbitrarily shaped excitation regions may be used, the middles of which extend substantially parallel to one another, in order to achieve the result described above. For example, concentric, in particular circular or elliptical, excitation regions may be used in order to achieve substantially isotropic emission of the desired oscillation mode in all directions. Since a group of oscillation elements which carry out such substantially isotropic emission may be regarded as a point source, at least at a sufficiently large distance, a plurality of such groups of excitation regions may also be arranged along a line or a curve without forming substantially arbitrarily shaped wavefronts in the far field.

Preferably, the same oscillation elements as are used for emission of the conducted wave, or the respective oscillation mode, may also be used in order to record measurement values by the corresponding oscillation transducer. In this case, particularly preferably mode-selective reception of precisely that oscillation mode which has been excited for the current measurement by the other oscillation transducer is carried out by the receiving oscillation transducer. This may be achieved in that measurement values of oscillation transducers which are assigned to different excitation regions are added together with a sign and/or phase and/or a time delay which is predetermined as a function of the desired mode to be received. In this way, a kind of comb filtering is carried out on the reception side in relation to the wavelength of the received mode. In particular, the aforementioned parameters may be selected in such a way that the signals of the oscillation elements of the different excitation regions cancel one another for the undesired oscillation mode, so that the influence of this mode on the result is substantially fully suppressed.

The excitation of the oscillation elements may be carried out in such a way that the oscillation patterns of a first and a second of the oscillation elements correspond to one another with a predetermined relative polarity and/or a predetermined relative phase shift, the predetermined polarities and/or phase shifts used for the mode-selective excitation of the first oscillation mode and for the mode-selective excitation of the second oscillation mode differing from one another. For example, the oscillation pattern of oscillation elements of one excitation region may be inverted or have a particular phase shift applied, in particular a phase shift of 180°, relative to the oscillation pattern for oscillation elements of another excitation region in order to change the oscillation mode to be excited. As explained above, in particular destructive interference of the respective undesired mode may therefore be achieved.

For the mode-selective excitation of the first and/or second oscillation mode, a first and a second oscillation element may be driven in such a way that the time profile of the oscillation amplitude of the second oscillation element corresponds to the time profile of the oscillation amplitude of the first oscillation element delayed by a delay time. The delay time may in this case preferably be selected in such a way that it corresponds to the time of flight of an oscillation mode to be attenuated, which is intended to be destructively interfered, from the first to the second oscillation element in the side wall. This time of flight may, for example, be ascertained by a previous measurement or determined from the dispersion relation of the side wall. If such a delay time is selected, the first and second oscillation elements may oscillate with opposite polarity. Because not only the relative phase angle of the oscillations but also the relative amplitude is adapted, while taking the time of flight into account, optimal attenuation of the undesired oscillation mode is achieved at least for one emission direction.

The described behavior may for example be achieved in that a common drive signal is used for operation of the first and second oscillation elements, although an additional retardation element is used which delays the drive signal of the second oscillation element or of the first oscillation element by a predetermined delay time. Such a construction of the first or respectively second oscillation transducer furthermore has the advantage that the spacings between the middles of the excitation regions, or the oscillation elements, may substantially be selected freely, an appropriate delay time merely having to be selected. The latter may readily be determined during ongoing operation or in a preparatory measurement, so that for example deviations due to production tolerances or current operating conditions may also readily be compensated for.

A similar procedure may also be used for filtering on the reception side. Measurement values which are received by the first or respectively second oscillation transducer may be time-delayed before they are added to the measurement values of the first or respectively second oscillation transducer, or subtracted therefrom. Mode selectivity on the reception side may therefore be straightforwardly achieved.

For at least one of the measurement directions, a further mode of the wave conducted in the side wall of the measurement tube may be excited mode-selectively by one of the oscillation transducers and conducted directly in the side wall or indirectly through the fluid to the other oscillation transducer and recorded there in order to determine further measurement data for the further oscillation mode, the oscillation frequency of the further mode differing from the oscillation frequency of the first and/or second mode, the result information being determined as a function of the further measurement data. The further oscillation mode is excited in a separate time interval, i.e. for example before or after the excitation of the first and second mode or between the time intervals within which the first or respectively second mode is excited. Since a different frequency is used for excitation of the further oscillation mode, it is typically no longer possible to achieve pure-mode excitation of the first, the second and the further mode merely by corresponding selection of the spacings of the excitation regions and the polarity of the excitation. It is therefore advantageous in particular, when the further mode is intended to be used, for the phase angle of the excitation in the excitation regions to be selected freely or at more than two levels. This may for example be achieved by the retardation element explained above, or in that separate drive signals are generated for the oscillation transducers. By the use of the further mode, additional information is available about the behavior of the measuring device, or of the fluid.

In this way, for example, a further range of a dispersion relation may be sampled. The result information may therefore be determined with higher reliability and accuracy.

The result information may be determined from the measurement data by an algorithm which is trained by a machine learning method. This may be advantageous in particular when, as measurement data for the at least four measurements carried out in the scope of the method according to the invention, not only a single value is recorded in each case, for example a signal time of flight or a signal amplitude, but rather a plurality of values, for example the signal time of flight and the amplitude, or even the entire recorded oscillation profile is intended to be evaluated. In this case, the relationship of the individual measurement data with the desired result information, i.e. for example a temperature or a composition of the fluid or the presence or amount of deposits in the measurement tube, may not directly be derivable theoretically and also not readily identifiable by first test measurements. It may therefore be advantageous to train the algorithm used for determining the result information so that it identifies the corresponding relationships by itself.

This may, for example, be possible if, in preparatory measurements for providing a training data set, the desired result information is already known or is determined in another way. For example, a multiplicity of training measurements may be carried out with different known fluid temperatures or compositions, and/or different amounts of deposits in the measurement tube. These known parameters may together with the measurement data form a training data set which may be used in the scope of monitored learning by the algorithm. If a neural network is being trained, for example, the error backpropagation approach known from other application fields may be used for the training, in which the measurement data are processed by the neural network and deviations of the result from the result information known from the training data set are reduced by minimizing a cost function.

As an alternative, it is also possible to specify the algorithm for determining the result information by, for example, using prior theoretical knowledge about the effects of properties of the fluid on signal times of flight, amplitudes or the like, or by statistically evaluating previous test measurements.

Besides the method according to the invention, the invention relates to a measuring device, in particular a flow meter, having a measurement tube that is used to receive or convey a fluid, a first and a second oscillation transducer arranged on a or a respective side wall of the measurement tube, and a control device, wherein the control device is adapted for carrying out the method according to the invention. The measuring device, or in particular the oscillation transducers of the measuring device, may furthermore be refined with the features explained in relation to the method according to the invention, with the advantages mentioned there.

Other features which are considered as characteristic for the invention are set forth in the appended claims.

Although the invention is illustrated and described herein as embodied in a method for operating a measuring device and measuring device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 shows a flowchart illustrating an exemplary embodiment of the method according to the invention; and FIG. 4 shows a detail view of another exemplary embodiment of a measuring device according to the invention.

DETAILED DESCRIPTION OF THE INVENTION

Figure 1:
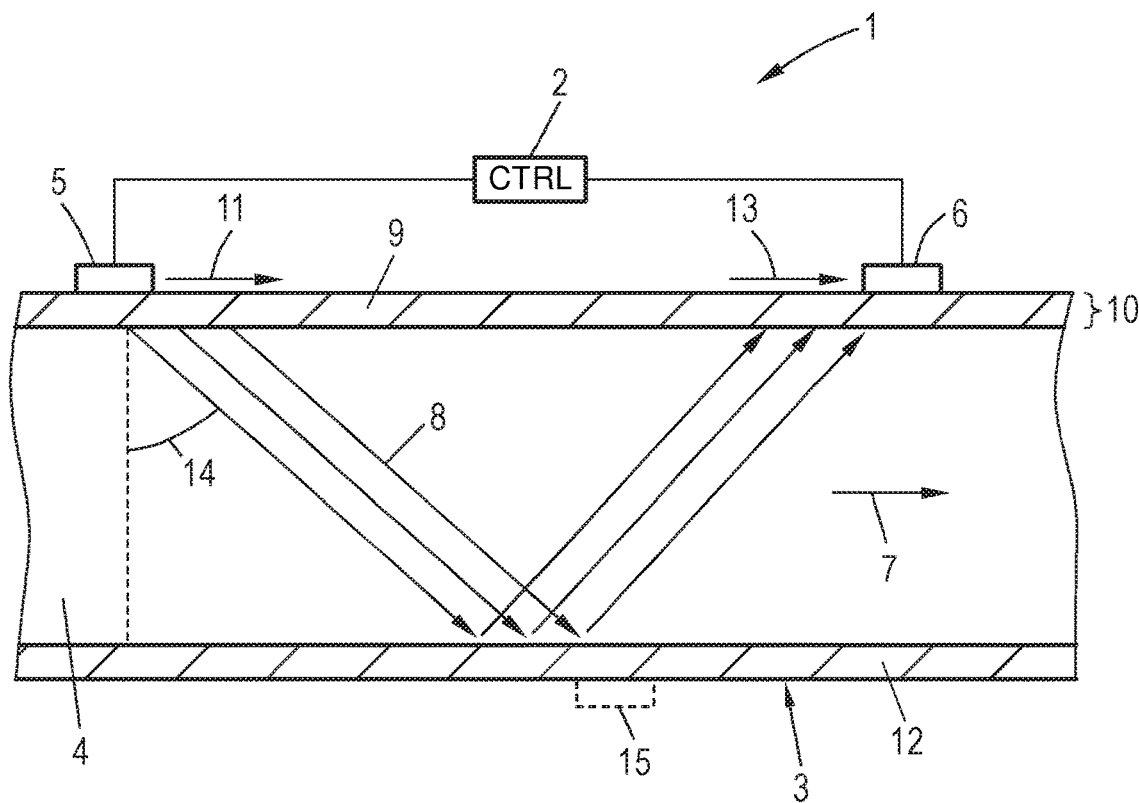
FIG. 1 is a schematic side view showing an exemplary embodiment of a measuring device according to the invention, by which an exemplary embodiment of the method according to the invention may be carried out.

Referring now to the figures of the drawing in detail and first, particularly, to FIG. 1 thereof, there is shown a measuring device 1 for determining a fluid quantity relating to a fluid and/or a fluid flow, in particular a flow volume. As will be explained in more detail below, the measuring device 1 is additionally adapted to determine result information which relates to the fluid itself and/or to the state of the measuring device 1.

The fluid is conveyed through an interior 4 of a measurement tube 3 in a direction shown by the arrow 7. In order to determine the fluid quantity, in particular the flow volume, a time-of-flight difference between the times of flight from a first oscillation transducer 5 to a second oscillation transducer 6, and vice versa, may be determined by a control device or controller 2. In this case, the fact is used that the time of flight depends on a velocity component of the fluid parallel to a propagation direction of an ultrasound beam 8 through the fluid. From this time of flight, it is therefore possible to determine a flow speed, averaged over the path of the respective ultrasound beam 8, in the direction of the respective ultrasound beam 8, and therefore approximately an average flow speed in the volume through which the ultrasound beam 8 passes.

In order on the one hand to allow the arrangement of the oscillation transducers 5, 6 outside the measurement tube 3, and on the other hand to reduce a sensitivity in relation to different flow speeds at different positions of the flow profile, an ultrasound beam 8, i.e. a pressure wave, is not induced directly in the fluid by the first oscillation transducer 5. Instead, a conducted wave is excited in a side wall 9 of the measurement tube 3 by the oscillation transducer 5. The excitation is carried out with a frequency which is selected in such a way that a Lamb wave is excited in the side wall 9. Such waves may be excited when the thickness 10 of the side wall 9 is comparable to the wavelength of the transverse wave in the solid, which is given by the ratio of the speed of sound of the transverse wave in the solid and the excited frequency.

The conducted wave that is excited in the side wall 9 by the oscillation transducer 5 is represented schematically by the arrow 11. Compression oscillations of the fluid are excited by the conducted wave, which are emitted into the fluid in the entire propagation path of the conducted wave. This is schematically represented by the ultrasound beams 8 mutually offset in the flow direction. The emitted ultrasound beams 8 are reflected at the opposite side wall 12 and conducted back through the fluid to the side wall 9. There, the incident ultrasound beams 8 again excite a conducted wave in the side wall 9, which is represented schematically by the arrow 13 can be recorded by the oscillation transducer 6 in order to determine the time of flight. As an alternative or in addition, it is possible to record the emitted ultrasound waves by means of an oscillation transducer 15 which is arranged on the side wall 12. In the example shown, the ultrasound beams 8 are not reflected, or are reflected only once, at the side walls 9, 12 on their path to the oscillation transducer 6, 15. It would, of course, be possible to use a longer measurement trajectory, the ultrasound beams 8 being reflected several times at the side walls 9, 12.

For the robust recording of a flow speed, or a flow volume, it is advantageous for the oscillation transducers 5, 6 to be configured in such a way that waves conducted through them with precisely one oscillation mode of a Lamb wave, i.e. for example only an asymmetrical Lamb wave or only a symmetrical Lamb wave can be excited. In this case, the compression waves are emitted at a Rayleigh angle 14, which depends on the speed of sound of the compression wave in the fluid and on the speed of sound of the mode excited in the side wall 9.

Figure 2:
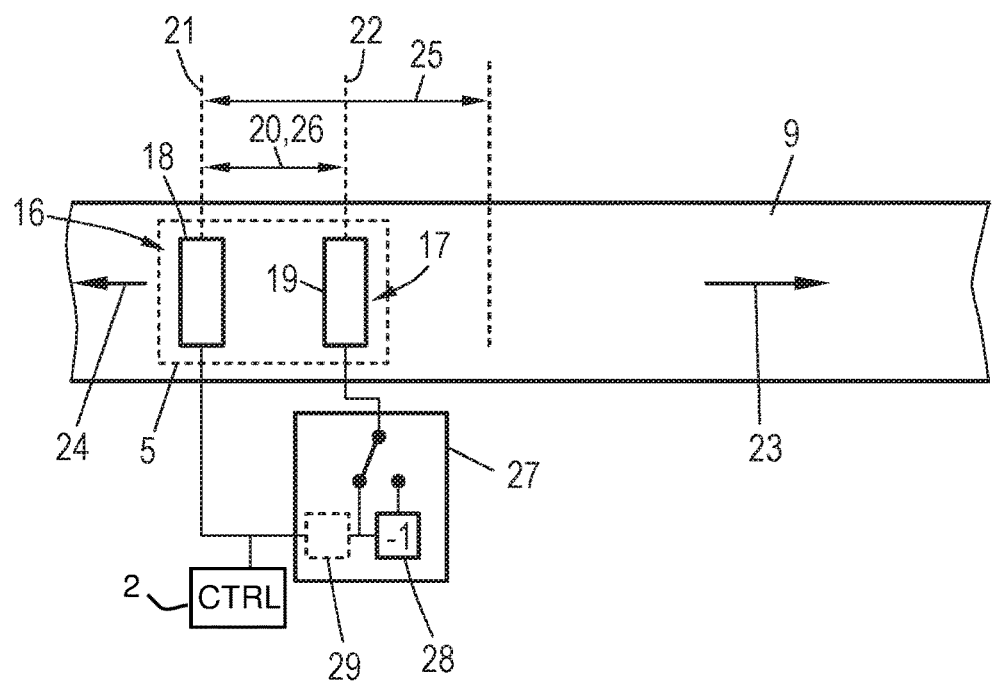
FIG. 2 is a schematic and diagrammatic side view of an exemplary embodiment of the invention.

As mentioned above, the intention is, in addition to the flow speed or quantity, to determine a further property of the fluid flowing through the measurement tube 3, in particular a physical or chemical property, such as a temperature, a pressure, a fluid type or a fluid composition, or diagnostic information relating to the measuring device 1, i.e. for example how greatly a measurement is influenced by deposits in the measurement tube 3, or in general whether there is a maintenance requirement. One possibility for determining corresponding quantities is to use oscillation transducers 5, 6 which can selectively excite different oscillation modes. In this case, a total of four measurements may be carried out, the propagation direction of the conducted wave and the oscillation mode used for the measurement being varied. The result information, i.e. for example one of the quantities mentioned above, may be determined from the measurement data of all these measurements. One possible construction for the oscillation transducer 5 which allows such selective mode excitation is represented in FIG. 2. Carrying out a plurality of measurements for different measurement directions and oscillation modes and jointly processing the measurement results will be discussed below with reference to FIG. 3.

FIG. 2 shows a construction of the oscillation transducer 5, by which substantially pure-mode excitation of an overall wave conducted in the wall 9 is possible, in which case different oscillation modes may selectively be excited. The oscillation transducer 5 comprises two mutually separated excitation regions 16, 17 in which partial waves, which are superposed to form the overall wave, respectively conducted in the wall 9 are excited by a respective oscillation element 18, 19, for example piezoelectric elements. Lamb waves are excited as partial waves. Since the oscillation elements 18, 19 are substantially rectangular and are coupled to the wall in the entire excitation region 16, 17, substantially plane waves are excited as partial waves, which are conducted through the wall 9 in the propagation directions 23, 24.

In order to carry out pure-mode excitation, the spacing 20 between the center lines 21, 22 of the excitation regions 16, 17, an excitation frequency predetermined by the control device 2, and the relative phase angle or polarity of the excitation, are selected in such a way that an oscillation mode of the partial waves which is to be attenuated is substantially suppressed by destructive interference in the propagation directions 23, 24. One simple possibility for achieving this is to select the excitation frequency such that a wavelength 25 of the oscillation mode to be attenuated, according to the dispersion relation of the wall 9, at the selected excitation frequency is twice as long as the spacing between the centers 21, 22 of the excitation regions 16, 17. Since the oscillation elements 18, 19 are constructed substantially identically and are driven by the control device 2 with a common drive signal, destructive interference of the partial waves results in relation to the oscillation mode to be attenuated, so that the latter is substantially fully suppressed. If the excitation frequency is then selected in such a way that only the oscillation mode to be attenuated and a single further attenuation mode are excited, which is readily possible with a known dispersion relation of the wall 9, substantially pure-mode excitation of the further oscillation mode can be carried out.

In the exemplary embodiment shown, the excitation frequency is selected in such a way that a wavelength 26 of the further excited oscillation mode is precisely half as long as the wavelength 25 of the oscillation mode to be attenuated. In this way, the advantage is achieved that the partial waves excited in the excitation regions 16, 17 constructively interfere in relation to the further oscillation mode, so that this oscillation mode is provided with a greater amplitude. If the oscillation elements 18, 19 are driven with the same drive signal, therefore, mode-selective or substantially pure-mode excitation of an oscillation mode with the wavelength 26 takes place.

In order to permit mode-selective or substantially pure-mode excitation for a second oscillation mode as well, a switching device 27 is used, which is represented as a separate component in FIG. 2 but may also be integrated into the control device 2 or the oscillation transducer 5. In the exemplary embodiment shown, a very simply constructed switching device is used, which makes it possible to switch between the input signal provided by the control device 2 and a signal inverted by an inverter circuit 28. Instead of using an inverter circuit 28, it would for example also be possible to modify the interconnection of the electrodes of the oscillation element 19 to the control device 2 in order to change the excited mode. For example, in order to excite the first oscillation mode the signal provided by the control device 2 may be applied to an electrode of the oscillation element 19 facing away from the measurement tube, and the electrode facing towards the measurement tube may be placed at an ground potential. In order to excite the second oscillation mode, a reversed interconnection may be used. The resulting effect corresponds substantially to the use of an inverter circuit 28.

Because of the inversion of the interconnection or of the drive signal, the oscillation element oscillates with an oscillation pattern which has a polarity that is reversed with respect to the oscillation pattern of the oscillation element 18. The effect of this is that destructive interference results for the first oscillation mode with the wavelength 26 and constructive interference results for the second oscillation mode with the wavelength 25, so that mode-selective or pure-mode excitation takes place for the second oscillation mode.

The mode purity may be further improved for the propagation direction 23 if it is ensured that the time profile of the oscillation amplitude of the second oscillation element 19 corresponds to the time profile of the oscillation amplitude of the first oscillation element 18 delayed by a delay time, the delay time corresponding to the time of flight of one of the excited modes from the first oscillation element 18 to the second oscillation element 19. If this is not ensured, a certain mode impurity may occur particularly at the start or end of an excitation pulse since, because of the time of flight between the oscillation elements 18, 19 and the finite length of the excitation pulse, for example, the oscillation element 19 would continue to oscillate when the conducted wave emitted by the oscillation element 18 has already passed through the region of this oscillation element.

One possibility for achieving this with low outlay is additionally to provide a retardation element 29, which delays the control signal provided by the control device 2 by this delay time. If the delay time is then selected in such a way that it corresponds to the time of flight of the oscillation mode to be attenuated between the oscillation transducers 18, 19 and inverted driving of the oscillation transducer 19 is carried out, then independently of the spacing 20 between the centers 21, 22 of the excitation regions 16, 17, it is possible to ensure that substantially fully destructive interference always results for the oscillation mode to be attenuated for the propagation direction 23, so that substantially pure-mode or mode-selective excitation results for the remaining oscillation mode. The selection of the oscillation mode to be excited is carried out by setting the delay time.

FIG. 3 shows a flowchart of a method for operating the measuring device 1, which makes it possible to study physical or chemical properties of the fluid, or the state of the measuring device. In this case, in step S1, the oscillation transducer 5 is initially driven by the control device 2 in order to mode-selectively excite a first oscillation mode, for example an asymmetrical mode, of a Lamb wave conducted in the side wall 9. The conducted wave is conducted directly or through the fluid to the second oscillation transducer 6, where in step S2 measurement data for this measurement direction and the first oscillation mode are recorded.

In steps S3 and S4, a corresponding measurement is repeated for a second measurement direction. In this case, in step S3, the oscillation transducer 6 is driven in order to mode-selectively excite the first oscillation mode and this is conducted directly or through the fluid to the first oscillation transducer 5, in order to record second measurement data there in step S4.

The method sequence above corresponds to a measurement method such as may, for example, be used in order to determine a flow speed and therefore also a flow rate. To this end, for example, it would be sufficient respectively to record times of flight of the conducted wave propagating through the fluid as first and second measurement data, i.e. the time between excitation at the oscillation transducer 5, 6 and reception at the respective other oscillation transducer 5, 6. The difference of these times of flight depends on the flow speed, so that the flow speed can be determined from the difference. A corresponding method is known in principle in the prior art.

In order, however, to obtain additional information about the fluid and/or information about the state of the measuring device, a change of the oscillation mode used is carried out in step S5. For example, the switching device 27 explained with reference to FIG. 2 may be used in order to switch between normal and inverted driving of at least one oscillation element of the respective oscillation transducer 5, 6. In this case, corresponding switching is preferably also carried out for the receiving oscillation transducer. For example, the signals of the oscillation elements 18, 19 may be added for reception of a first mode and subtracted for reception of the second oscillation mode. As an alternative, as explained, a delay time could be modified in order to change the excited or received mode.

Steps S6 to S9 in turn correspond to steps S1 to S4, the oscillation transducer 5 or 6 respectively being excited in steps S6 or S8 in order to excite the second oscillation mode, so that in steps S7 and S9 measurement data relating to the second oscillation mode for the first or respectively second measurement direction are also determined.

In step S10, a total of four sets of measurement data are therefore provided. The measurement data may, as already explained, in the simplest case be pure signal times of flight. As an alternative or in addition, the oscillation amplitudes of the respectively received oscillation may also be taken into account as measurement data. In principle, it is also possible respectively to use the entire profile of the received oscillation as measurement data, for example a digitized signal of the respective oscillation transducer 5, 6. From these measurement data, in step S10, result information may be determined which relates to a property of the fluid, i.e. for example a temperature, a static pressure or a type or composition of the fluid, and/or the state of the measuring device, for example popping of the measurement tube by deposits. To this end, for example, a difference of the signal times of flight between the first and second measurement directions may initially be determined for each of the oscillation modes, and the result information may be determined as a function of the difference or of the ratio of these differences, for example with the aid of a lookup table.

Highly relevant information, on which the result information may depend, are also the differences or the ratios of the signal times of flight or reception amplitudes for the different oscillation modes in the same measurement direction.

Particularly when complex measurement data are intended to be taken into account, for example a digitized oscillation profile, it may be advantageous for an algorithm which has been trained by a machine learning method to be used in step S10. By previous training measurements, in which the corresponding measurement data are respectively determined for previously known result information, such an algorithm may also be trained to identify and learn relationships which are initially difficult to identify between the measurement data and the result information.

FIG. 4 shows an alternative embodiment of the oscillation transducer 5, which could be used instead of the embodiment explained with reference to FIG. 2. While the embodiment shown in FIG. 2 substantially produces plane wavefronts, it may be advantageous, for example in the case of very wide side walls, to achieve substantially isotropic emission of the conducted wave, so that the oscillation transducer 5 acts as a point source. A plurality of the arrangements shown in FIG. 4 may also be used, for example along a line, in order to be able to achieve a substantially plane wavefront by a plurality of effective point radiators at least in the far field.

In order to achieve substantially isotropic emission, the oscillation transducers 30 are arranged on a first circle 31 and the oscillation transducers 33 are arranged on a second circle 34, the two circles having the same center 32. The spacing 35 between the circles 31, 34 may be selected as explained with reference to FIG. 2 in relation to the spacing 20 of the middles of the excitation regions 16, 17. When the oscillation elements 30 are driven as explained with reference to the oscillation elements 18, and the oscillation elements 33 are driven as explained with reference to the oscillation elements 19, pure-mode isotropic emission of the respective desired oscillation mode approximately results.

The isotropy could be further improved if continuous circles were used as oscillation elements instead of the oscillation elements 30, 33 in the form of arcuate or circle segments. The use, shown in FIG. 4, of smaller circle elements nevertheless allows simpler production since large-area ceramic parts need to be handled with great care in the scope of production in order to avoid damage.

In one exemplary embodiment (not shown), the circular shape shown could furthermore be deviated from, for example by using ellipses instead of the circles 31, 34.

To summarize once more, there is described a method for operating a measuring device, in particular a flow meter, which comprises a measurement tube 3 that is used to receive or convey a fluid, a first and a second oscillation transducer 5, 6 arranged on a or a respective side wall 9 of the measurement tube 3, and a control device 2, wherein the control device 2, for a first measurement direction, drives the first oscillation transducer 5 chronologically in succession for respective mode-selective excitation of a first and a second oscillation mode of a wave conducted in the side wall 9 of the measurement tube 3, and for a second measurement direction drives the second oscillation transducer 6 chronologically in succession for respective mode-selective excitation of a first and a second oscillation mode of a wave conducted in the side wall 9 of the measurement tube 3, the excited waves respectively being conducted directly in the side wall 9 or indirectly through the fluid to the respective other oscillation transducers 5, 6 and recorded there in order to determine respective measurement data for the respective measurement direction and oscillation mode, wherein result information relating to a property of the fluid or a state of the measuring device 1 is determined by the control device 2 from the measurement data for both measurement directions and both respective oscillation modes.

The following is a list of reference numerals and symbols used in the above description:

- 1 measuring device
- 2 control device
- 3 measurement tube
- 4 interior
- 5 oscillation transducer
- 6 oscillation transducer
- 7 arrow
- 8 ultrasound beam
- 9 side wall
- 10 thickness
- 11 arrow
- 12 side wall
- 13 arrow
- 14 Rayleigh angle
- 15 oscillation transducer
- 16 excitation region
- 17 excitation region
- 18 oscillation element
- 19 oscillation element
- 20 spacing
- 21 middle, center
- 22 middle, center
- 23 propagation direction
- 24 propagation direction
- 25 wavelength
- 26 wavelength
- 27 switching device
- 28 inverter circuit
- 29 retardation element
- 30 oscillation element
- 31 circle
- 32 center
- 33 oscillation element
- 34 circle
- 35 spacing
- S1-S10 method steps

The invention claimed is:

1. A method of operating a measuring device, the measuring device including a measurement tube for receiving or conveying a fluid, a first oscillation transducer and a second oscillation transducer arranged on a side wall of the measurement tube, and a control device, the method comprising:
    for a first measurement direction, driving the first oscillation transducer with the control device chronologically in succession for a respective mode-selective excitation of a first and a second oscillation mode of a first wave conducted in the side wall of the measurement tube;
    for a second measurement direction, driving the second oscillation transducer with the control device chronologically in succession for a respective mode-selective excitation of a first and a second oscillation mode of a second wave conducted in the side wall of the measurement tube;
    wherein the first wave thus excited is conducted either directly in the side wall or indirectly in the side wall and through the fluid to the second oscillation transducer and recorded there, and the second wave thus excited is conducted either directly in the side wall or indirectly in the side wall and through the fluid to the first oscillation transducer and recorded there, for determining respective measurement data for the respective measurement direction and oscillation mode; and
    determining, with the control device, result information that relates to a property of the fluid or a state of the measuring device from the measurement data for both measurement directions and both oscillation modes; and
    initially mode-selectively exciting the first oscillation mode by the first and second oscillation transducers and recording measurement values for the first oscillation mode for both measurement directions; and
    subsequently mode-selectively exciting the second oscillation mode by the first and second oscillation transducers and recording measurement values for the second oscillation mode for both measurement directions.

2. The method according to claim 1, which comprises exciting oscillation modes with equal frequency as the first oscillation mode and the second oscillation mode, and/or generating the first and second oscillation modes as oscillation modes of a Lamb wave.

3. The method according to claim 1, wherein the result information relates to at least one parameter selected from the group consisting of a temperature of the fluid, a static pressure of the fluid, a type of the fluid, a composition of the fluid, and a presence of deposits in the measurement tube.

4. The method according to claim 1, wherein the respective measurement data relate to a respective signal time of flight of the respective oscillation mode for the respective measurement direction between the first and second oscillation transducers and/or to a reception amplitude for the respective oscillation mode and measurement direction.

5. The method according to claim 4, which comprises respectively determining a difference of the signal times of flight between the first and second measurement direction for the first and second oscillation modes, determining the result information as a function of the difference or of a ratio of the differences between the signal times of flight, and/or determining the result information as a function of a difference or of a ratio of the signal times of flight or reception amplitudes between the first and second oscillation modes for one given measurement direction.

6. The method according to claim 1, wherein at least one of the first or second oscillation transducers comprises a plurality of oscillation elements, and the method comprises carrying out the mode-selective excitation of at least one of the first or second oscillation modes by exiting partial waves conducted in the side wall, which are superimposed to form the respective conducted wave, in a plurality of mutually separated excitation regions of the side wall by at least one of the oscillation elements, which is oscillation-coupled to the respective excitation region, and driving the oscillation elements to at least partially suppress the respective other oscillation mode by destructive interference of the partial waves.

7. The method according to claim 6, which comprises carrying out the excitation of the oscillation elements such that oscillation patterns of a first and a second of the oscillation elements correspond to one another with a predetermined relative polarity and/or a predetermined relative phase shift, and wherein the predetermined relative polarities and/or phase shifts used for the mode-selective excitation of the first oscillation mode and for the mode-selective excitation of the second oscillation mode differ from one another.

8. The method according to claim 6, which comprises, for the mode-selective excitation of the first and/or second oscillation mode, driving a first and a second of the oscillation elements in such a way that a time profile of the oscillation amplitude of the second oscillation element corresponds to a time profile of the oscillation amplitude of the first oscillation element delayed by a delay time.

9. The method according to claim 1, which further comprises:
for at least one of the measurement directions, mode-selectively exciting a further mode of the wave conducted in the side wall of the measurement tube by one of the oscillation transducers and conducting the further mode wave either directly in the side wall or indirectly in the side wall and through the fluid to the respectively other oscillation transducer and recording the further mode wave there in order to determine further measurement data for the further oscillation mode, wherein an oscillation frequency of the further mode differs from the oscillation frequency of the first and/or second mode; and determining the result information as a function of the further measurement data.

10. The method according to claim 1, which comprises determining the result information from the measurement data by an algorithm which is trained by a machine learning method.

11. The method according to claim 1, wherein the measuring device is a flow meter.

12. A measuring device, comprising:
a measurement tube disposed to receive or convey a fluid;
a first oscillation transducer and a second oscillation transducer each arranged on a side wall of said measurement tube; and
a control device connected to said first and second oscillation transducers and configured for carrying out the method according to claim 1.

13. The measuring device according to claim 12 being a flow meter.

* * * * *